UNITED STATES PATENT OFFICE.

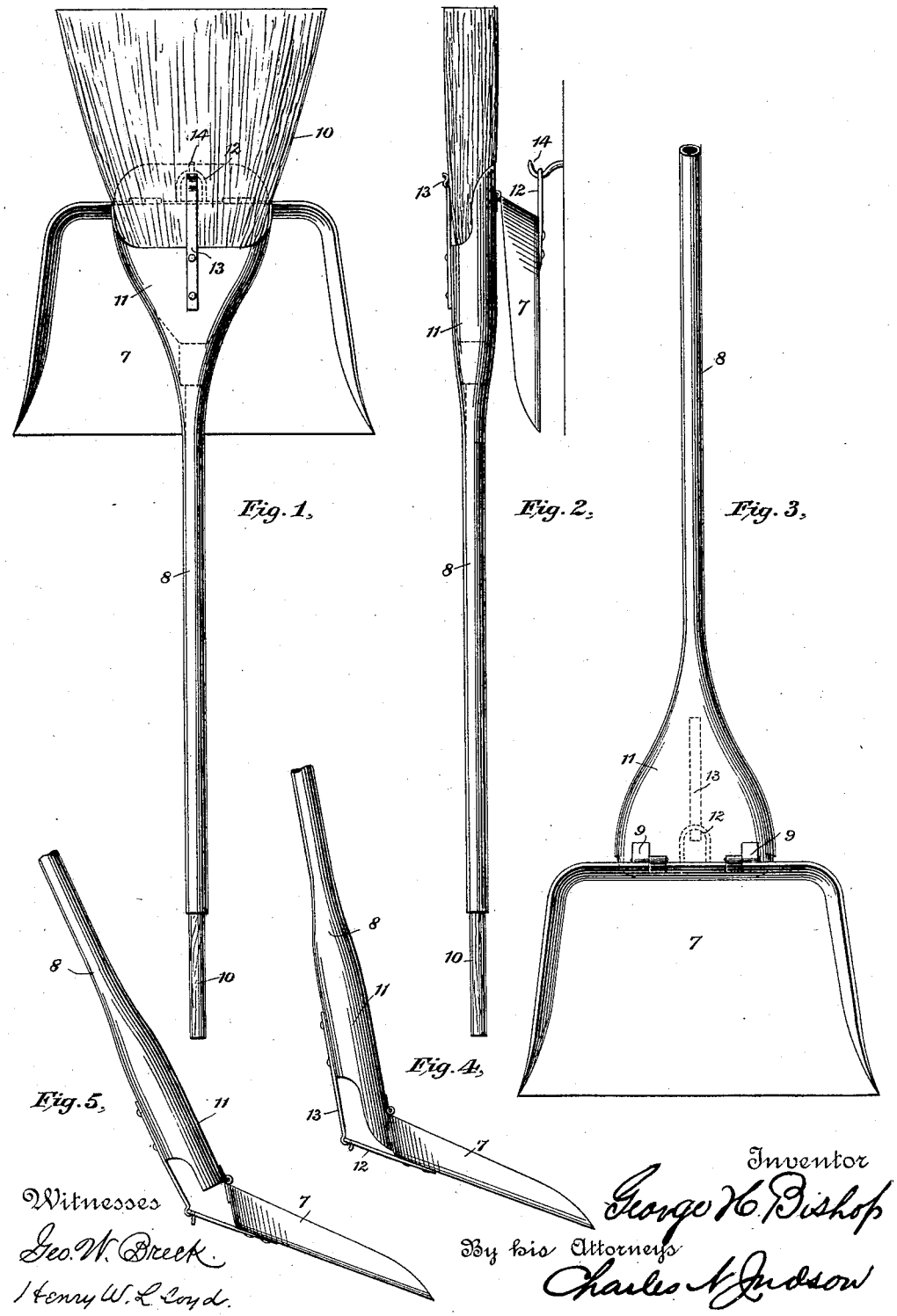

GEORGE H. BISHOP, OF NORTHPORT, NEW YORK.

DUST-PAN AND BROOM-HOLDER.

SPECIFICATION forming part of Letters Patent No. 452,358, dated May 19, 1891.

Application filed June 30, 1890. Serial No. 357,302. (No model.)

*To all whom it may concern:*

Be it known that I, GEORGE H. BISHOP, a citizen of the United States, residing at Northport, in the county of Suffolk and State of New York, have invented a certain new and useful Combined Dust-Pan and Broom-Holder, of which the following is such a full, clear, and exact description as will enable any one skilled in the art to which it appertains to make and use the same, reference being had to the accompanying drawings, forming part of this specification.

My invention relates to a combined dust-pan and broom-holder which comprises, essentially, a dust-pan having attached thereto a holder adapted to receive and hold a broom when the same is not in use, the chief objects of the invention being to provide means whereby a broom and dust-pan may be conveniently kept together when not in use and to provide a dust-pan that may be more easily manipulated than the ones heretofore in use.

In the accompanying drawings, in which like numbers of reference indicate like and corresponding parts throughout, I have illustrated my invention.

The drawings are as follows: Figure 1 is a front elevational view of the device folded and hung up with a broom placed therein. Fig. 2 is a side view of the device shown in Fig. 1. Fig. 3 is a front elevational view of the combined device with the broom removed and the dust-pan adjusted in position for use. Fig. 4 is a side view of the device shown in Fig. 3, with the upper portion of the tubular handle constituting the broom-holder broken away. Fig. 5 is a similar view of a modified form of the device.

Referring to the drawings, 7 designates an ordinary dust-pan used for taking up sweepings. The back of the pan 7 is hinged, preferably at the top edge thereof, to a handle 8 by means of hinges 9, the line of the hinges being a slight distance from the end of the handle 8, so that the pan 7 when unfolded or dropped down into position for use may bear against the handle 8, to limit the movement thereof, as will be clearly understood from the drawings. The construction of the pan and the handle is such that the two form an obtuse angle with each other when the pan is in position for use, and this angle may be varied, as desired, as will be understood from comparing Figs. 4 and 5.

The handle 8 is designed and adapted to receive and hold a broom 10, and is preferably formed hollow or tubular with its hinged end enlarged or expanded at 11 to receive the body of the broom, which may rest loosely therein or may be provided with a fastener for holding it securely within the holder.

In order to hold the dust-pan firmly in position for use—that is, in its unfolded position, as shown in Figs. 3, 4, and 5—I provide a snap-lock consisting of a loop or eye 12, mounted upon the pan 7, and a spring latch or hook 13, secured upon the handle. This loop and hook are so adjusted that when the pan is unfolded or swung outwardly from the handle the loop 12 will snap into locked position and hold the pan sufficiently firm to prevent its swinging or wabbling when being used. The pan may be unlocked by forcibly pushing upon the end of it to fold it down on the handle or by releasing the spring-hook 13 from the loop 12 by hand. The device is provided with a hanger or suspending hook, which in the present construction is the part 12, which forms part of the locking device just described. The suspending device 12 may be of any suitable form and may be attached to any preferred part of the device. The handle 8, which constitutes the holder, may be made in any desired shape and the length thereof may be greater or less, as desired.

In the modification shown in Fig. 4 the dust-pan 7 is hinged to the extreme edge of the receiving end of the holder 8, so that its back does not rest against the handle when adjusted in position for use. By virtue of this construction the angle between the handle and the pan is rendered greater and may be found more convenient for use.

When the broom and dust-pan are not in use the pan is folded down on the handle, which is inverted, and the broom 10 is then inserted in inverted position within the handle or holder 8, and the apparatus may then be suspended in an out-of-the-way place by means of the loop 12 and the hook 14, which latter is mounted upon a wall or any convenient attaching surface. The broom 10 may readily be removed from the holder 8 by merely lifting it out of the same, and when it is desired to use the dust-pan the combined pan and holder is removed from the hook 14 and inverted, the pan being unfolded and dropped into position, as shown in Figs. 4 and 5.

Having thus described my improved combined dust-pan and broom-holder, what I claim as my invention, and desire to secure by Letters Patent, is—

1. A dust-pan having a tubular handle hinged at or near one end to the pan and having the end thereof near the pan expanded or enlarged to receive the body of the broom when the same is placed within the handle in position of disuse, for the purpose set forth.

2. The combination, with a tubular handle adapted to receive and hold a broom, of a dust-pan hinged by the upper edge of its back to the handle near the end thereof at which the broom is entered therein and removed therefrom, the back of the pan resting against the handle to limit its movement when adjusted in position for use, substantially as and for the purpose set forth.

3. The combination, with a dust-pan 7, provided with a loop 12, of the extended tubular handle 8, hinged thereto and adapted to receive and hold a broom when in disuse, substantially as and for the purpose described.

4. In a combined dust-pan and broom-holder, the combination, with a tubular handle 8, serving as a handle for the pan when in use and adapted to receive and hold a broom when the device is folded up in disuse, of a dust-pan 7, hinged by its back to the end of the handle receiving the broom and folding over upon the said handle when in disuse, substantially as and for the purpose set forth.

5. In a combined dust-pan and broom-holder, the combination, with a tubular handle 8, formed with a flaring receiving end for the broom and serving as a handle for the pan when in use and adapted to receive and hold a broom when the device is folded up in disuse, of a pan 7, hinged by its back to the flaring end of the handle and adapted to fold over upon the handle, a spring finger or latch 13, mounted upon the handle, and a loop 12, secured to the pan and engaged by said finger or latch, substantially as and for the purpose set forth.

In testimony whereof I have hereunto set my hand, this 19th day of June, 1890, in the presence of the two subscribing witnesses.

G. H. BISHOP.

Witnesses:
ROWLAND MILES,
ISRAEL CARLL.